Figure 1:
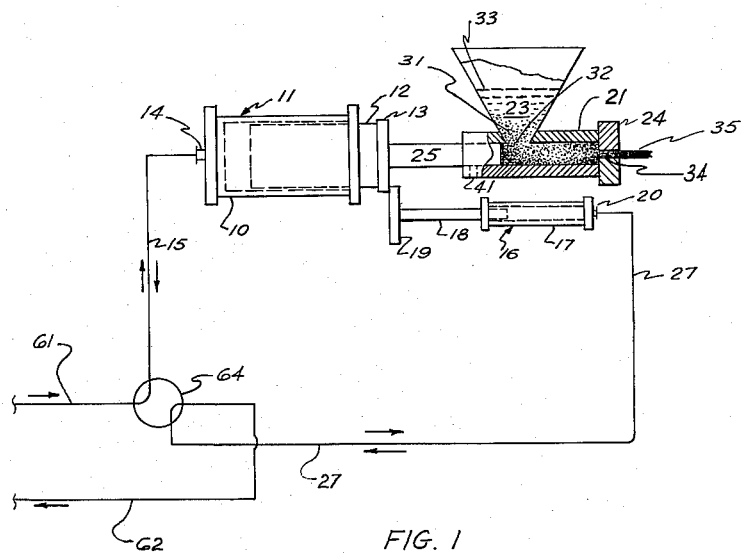

… …

2,994,109
TREATING HIGH SOLIDS SLUDGES
Henry A. Thomas, Baton Rouge, La., assignor to Ethyl Corporation, New York, N.Y., a corporation of Delaware
Filed Nov. 29, 1957, Ser. No. 699,840
2 Claims. (Cl. 18—55)

This invention relates to the processing of high solids sludges. More specifically, the invention relates to an improved process of treating sludges, wherein the solids are predominantly malleable metals, to resolve the liquid portion and the solids portion, the latter as cohesive solid shapes.

Various methods of processing industrial sludges have been utilized heretofore to resolve the liquid and the solid phases for recovery and subsequent processing of these separate components. For example, in the treatment of sludges from organometallic processes, such as those resulting from the process for manufacturing tetraethyllead, steam heated driers are used to eliminate the liquid phase and prepare the solids or lead content for smelting. It has been found however that high solids sludges of this type can be very effectively resolved into a liquid phase and a solids phase and the recovered solids smelted without the relatively expensive thermal drying operation. This non-thermal operation involves the extrusion of the metal solids as cohesive rod-like bars or shapes and, concurrently with such extrusion, the release of most of the liquid phase, or phases, from the solids content. In addition to being a moderate temperature operation, this technique results in the production of the metals content in a massive form which is particularly suitable for smelting, whereas the finely divided dust and powder from a thermal drying operation are much more difficult to smelt and are more readily oxidizable.

With this improved process however, certain incidental, though important, problems have been introduced. For example, in the extrusion of lead from aqueous lead sludges containing quantities of tetraethyllead, the extruded product is found to contain from about 1 percent to about 3 percent by weight of the liquid which was originally present in the sludge. As this liquid includes an appreciable proportion of tetraethyllead, the efficient separation of solids and liquids is obviously quite important.

In the feeding of charges of liquids, plastics or other liquid-like materials into a compression-extrusion chamber a simple technique has been to place the material to be charged into a feed hopper and allow it to gravitate into said compression-extrusion chamber. This technique has even proven quite successful in the charging of free flowing, dry metallic particles. Where, however, the material to be charged is a finely divided wet solid material or a high solids content sludge this technique has proven unsatisfactory. The solids of the sludge tend to cling to the walls of the feed hopper and accumulate therein. The liquid portion tends to channel into and fill the compression-extrusion chamber. Frequent interruptions of the operation are thus necessitated.

Another method which would normally be available in the feeding of solids charges into a compression-extrusion chamber, wherein a simple gravitation technique could not be utilized, is to provide an auxiliary ram or plunger. However, in the case of feeding high solids content sludge into a compression-extrusion chamber, this technique has failed for very much the same reasons the gravitational technique has failed. Difficulties were encountered with providing a continuous source of feed supply in the path of the plunger or ram to be conveyed to the said compression-extrusion chamber. This technique, complex in itself, has another disadvantage, viz., when sludges containing toxic components are handled, this unit should preferably be screened from the atmosphere by protective enclosures or similar devices, which complicate the apparatus.

As a result of this combination of factors, the processing of sludges of the character described by means of extrusion techniques has been subject to severe production limitations, particularly occasioned by the difficulty of feeding, which threaten its applicability.

It is accordingly an object of the present invention to provide a new and improved technique for the resolution and recovery of the liquids and the solids contained in high solids sludges and for the production of the solids content thereof into valuable or readily treatable bar-like shapes. It is also an object of the invention to provide a new, novel, and simple process especially suited for the rapid and efficient feeding of a uniform charge of high solids sludge to an extrusion-deliquefying operation. Another object, especially of certain embodiments, is to provide a method for the treatment of sludges of the type described, which provides for the more effective removal of the valuable organo-metallic or non-aqueous components from the extruded product. Other objects will appear hereinafter.

Figure 2:
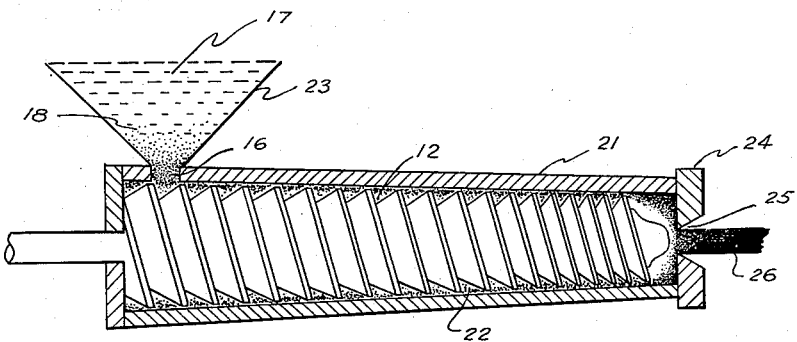

A complete understanding of the invention may be obtained from the following description of the method as applied in two types of apparatus. FIGURE 1 is a schematic illustration of a ram type extrusion press for carrying out the process, including a hopper for supplying the sludge to the extrusion apparatus proper. FIGURE 2 is an illustration of a screw type extrusion press, also in conjunction with an appropriate hopper forming a supply zone for the sludge to be fed.

The invention comprises providing a feed supply of high lead solids sludge within a supply zone adjacent to and communicating with a compression-extrusion zone having an extrusion aperture, withdrawing charges of sludge from the supply zone and feeding them into the compression-extrusion zone. In this zone pressure is applied and the sludge is deliquefied and the solids thereof compacted and extruded through the extrusion aperture. The feeding operation is further specifically characterized in that a substantially solids-free liquid layer is continually maintained and at all times surmounts the solids in the supply zone. The operation within the compression-extrusion zone is a dual functioning operation in that the pressure applied to the sludge feed accomplishes deliquefication of the sludge and a concurrent compaction and extrusion of the solids thereof as almost liquid-free cohesive solid shapes. The operation within the compression-extrusion zone specifically embodies, concurrently with the extrusion, plastic deformation and working together of the lead or solid particles to form a low liquid content, solid bar-like product. A preferred technique for the operation of a ram type extrusion press is to serially feed a plurality of charges into the compression-extrusion chamber thereof. By this method, each of the charges are partly deliquefied, by low pressure compression strokes, and the cumulated charges provide a larger mass of pressed solids within said chamber prior to the slower higher pressure extrusion stroke.

Maintaining continuously a surmounting substantially solids free liquid layer above the solids of the sludge is a necessary and vital feature of the operation and provides unanticipated benefits without expected deleterious effects. The surmounting substantially solids-free liquid layer results in the desired feeding of the sludge into the compression-extrusion zone. The feeding is accompanied by the liquid phase and surprisingly, although an object of the overall process is to remove liquid, this feature does not hamper the attainment of this result, even though more liquid is thus customarily deliberately introduced to the compression-extrusion zones.

The surmounting liquid phase can be derived entirely or in part from the liquid phase accompanying the raw sludge, dependent upon the relative proportions of solids and liquids in the raw sludge. By a high solids lead sludge is meant that the volume occupied by the solids is at least one-fifth of the total volume of the sludge. Often the volume occupied by the solids exceeds one-third of the total sludge volume. It is found in most instances, particularly when the volumetric proportions of the solids are above about 15 percent of the sludge volume, that an additional supply of liquid is necessary to preserve the essential liquid layer. The supplemental liquid feed can be added intermittently or in an apportioned liquid stream to provide the desired and necessary surmounting liquid phase. In other cases wherein the relative volumetric proportions of lead solids are lower, the initial aqueous phase present may be adequate to supply the essential solids free liquid layer.

The essential substantially solids free liquid layer added to or provided within the feed zone is not limited to water or other aqueous liquid, nor is it limited to a liquid miscible with water. It has been found that certain additional benefits are derived by providing a liquid which is miscible with tetraalkyllead and yet immiscible with water. The addition of such a liquid to the supply zone results in the recovery of more tetraethyllead than would occur with the addition of water or liquid miscible with water. The addition of such a liquid phase frequently provides a supplemental benefit in that the separation of the alkyllead from the solids is benefited, the liquid also performing the benefit of expediting the feeding operation. The rigorous mechanical forces, applied to the solids in the course of the compression-extrusion operation, are believed to expedite the elutriation of the alkyllead which is present as a surface film on the high surface solids. The solution is then separated from the compression-extrusion zone with and in the same manner as the accompanying liquids. The alkyllead component can then be separated from the liquid phase by various means, for example, by distillation.

Referring to FIGURE 1, it will be seen that the principal parts of the apparatus include an extrusion machine 21, of the plunger type, a feed hopper 23, a main ram assembly 11, a supplemental ram assembly 16 and hydraulic fluid supply lines 15, 27 connected to a high pressure manifold 61 and low pressure manifold 62 through a four-way valve 64. Pump means (not shown) are provided for supplying the hydraulic liquid under necessary pressure.

The extrusion machine 21 includes an extrusion chamber 22 wherein there is mounted for sliding fit a mating plunger 25. Communicating with the extrusion chamber 22 is the feed hopper 23 which provides a supply of the high solids sludge 31 to be processed for feeding through a feed port 32 in the wall of the extrusion machine 21. A layer of liquid 33 is maintained above the solids content of the sludge 31 within the feed hopper 23. A valved conduit, not shown, is provided for feeding additional liquid to the feed hopper 23. The end of the extrusion chamber 22 is capped by a die assembly 24, having an aperture or die 34 of smaller transverse area than the extrusion chamber 22 proper. The ratio of the transverse area of the extrusion chamber 22 to that of the transverse area of the die 34 is termed "extrusion ratio." For the processing of high solids lead sludges the extrusion ratio may vary from about 1.5:1 to about 50:1. A preferable range is from about 3:1 to about 30:1. It will be seen that in operation movement of the plunger 25 toward the die assembly 24 will force the solids of the charge of high solid sludge through the aperture or die 34 of the die assembly 24, provided sufficient pressure is exerted.

The main ram assembly 11 includes a barrel 10 with a ram or piston 12 closely fitted therein for sliding movement. The ram 12 makes contact with the end of the plunger 25 of the extrusion machine assembly 21. The ram 12 bears against a heavy plate or platen 13 which sustains the high mechanical forces generated in the working operation. Guide rods or bars (not shown) are provided to assure movement of the platen 13 on a straight, horizontal path. Normally, the platen 13 is fastened to the end of the extrusion machine plunger 25. The main ram assembly cylinder or barrel 10 is fitted with a hydraulic liquid supply nozzle 14. A supply line 15 connects to the nozzle for feeding or discharging of the appropriate hydraulic actuating liquid.

The supplemental ram assembly 16 includes a chamber formed by the ram cylinder 17, generally of appreciably smaller transverse dimensions than the cylinder 10 of the main ram assembly 21, having a plunger or piston 18 slideably positioned therein. A nozzle 20 is fitted to the end of the ram cylinder 17 for joining thereto a line 27 which is provided to supply or discharge the actuating hydraulic liquid. On the end of the piston 18 of the supplemental ram assembly 16 is a connecting bracket 19 which is attached to or abuts the platen 13 at the end of the main ram proper 12.

The four-way valve 64 connects the four conduits, or lines 15, 27, 61, 62 and provides two alternative channels. In every case when fluid flows from the high pressure manifold 61 into line 15, fluid is returned from line 27 into the low pressure manifold 62. Alternatively when fluid flows from the high pressure manifold 61 into line 27 fluid is returned from line 15 into the low pressure manifold 62. In the operation of any ram type extrusion press the cycle includes both "working strokes" and "retraction strokes." Flow of hydraulic fluid from the high pressure manifold 61, through valve 64, fuel line 15 and into the main ram assembly 11 produces a "working stroke" which is the movement of the main ram 12, and consequently the plunger 25, toward the die assembly 24. A "non-working" or "retraction stroke" is the movement of said main ram 12, and plunger 25 in the opposite direction and is produced by flow of hydraulic fluid from the high pressure manifold 61, through valve 64, through line 27 and into the supplemental ram assembly 16.

The advantages and beneficial features of the method is readily understood from a description of an operating cycle.

A supply of sludge 31, surmounted by a layer of liquid 33, is provided within the feed hopper 23. A working stroke, which is a movement of the main ram 12, and plunger 25, toward the die assembly 24 produces a deliquefication of the charge and a compaction of the solids thereof. As said movement continues there results a plastic deformation and working together of the solids particles of the sludge, and finally an extrusion thereof through the die 34. A portion of the liquid from the sludge is expressed through the die 34 and a portion thereof escapes around the face of the ram and out of the extrusion press through the port 41. Usually, because of the relatively great pressure applied to the charge, a clearance of about 0.001 inch per inch of plunger 25 diameter around the circumference of the face of the plunger 25 is sufficient to provide for removal of the liquid. Following the extrusion there is produced a rapid retraction stroke, or nonworking stroke, by the reversal of the flow of hydraulic fluid. Thus, the extrusion chamber 22 having been largely cleared of its contents, and the main ram 12 and plunger 25 being forced relatively rapidly in a direction away from the die assembly 24 there is generated a vacuum. This retraction is continued until the plunger 25 has moved far enough backward to allow opening of the feed port 32 to the feed hopper 23. At that moment a fresh charge of sludge 31, and accompanying liquid 33, are forcibly withdrawn from the feed hopper 23. The extrusion chamber 22 is substantially completely filled. The feeding produces a turbulence within the feed hopper 23 which agitates and mixes the contents thereof. This action helps to create a homogeneous or more uniform charge for subsequent feeding. With this action the cycle is complete, i.e., each working stroke deliquefies the charge and compacts the solids thereof; said working stroke continuing until there results plastic deformation and working together of the solids particles and finally at the termination thereof, there results an extrusion of the solids through the die 34. Each nonworking stroke or retraction stroke generates a vacuum within said extrusion chamber 22 which aids in automatically refilling said extrusion chamber 22 and agitates the contents within the feed hopper 23, thus preparing a uniform charge for subsequent feeding.

As noted above, the retraction of the plunger 25 of the extrusion apparatus appears to generate a vacuum in the extrusion chamber. This appears to occur despite the minor clearances provided between the plunger 25 and the walls of the chamber 22. It is believed that, although such clearances are adequate for the escape of liquid during the relatively high pressures of a working stroke, nevertheless, since pressure differentials accompanying a vacuum are limited to atmospheric pressure, this is not enough to result in air leakage into the chamber. Hence, the force of the vacuum is applied to the sludge in the feed zone and sludge is thereby induced into the chamber 22.

Generally, in processing a high solids sludge wherein the solids are finely divided lead particles a preferable range of pressure to produce an extrusion is from about 11,000 pounds per square inch to about 26,000 pounds per square inch. Considerable latitude consists however because the extrusion pressure needed appears to be directionally proportional to the logarithm of the extrusion ratio and is also dependent upon the nature of the metal component of the sludge.

While the foregoing description of the process has been given in relation to a ram type extrusion press, it will be understood that the apparatus may assume a variety of forms. Another such apparatus suitable for carrying out the method may be a screw type extrusion press as illustrated in FIGURE 2.

Referring to FIGURE 2, it will be seen that the principal parts of this apparatus include an extrusion machine 21 of the screw type, a feed hopper 23, and drive means (not shown) for rotating the screw 12 of said extrusion machine 21.

The extrusion machine 21 includes an extrusion barrel or extrusion chamber 22 of converging cross section which is provided with a rotatable impeller or screw 12. The whole length of the impeller or screw 12 is provided with threads of variable pitch which fit closely within the chamber 22. The pitch of the threads increases and the cross sectional area of the extrusion chamber 22 decreases toward the extrusion end of the extrusion machine 21. Means (not shown) are provided for rotating the screw 12 to force high solids sludge through the length of the chamber 22. Progress of the sludge through the extrusion chamber 22 is marked by deliquefication and finally extrusion of the solids thereof through the die 25 as a cohesive solid shape 26. A slight clearance, usually about 0.001 inch per inch of diameter of the screw 12, is provided around the circumference of the chamber 22 to provide for the passage of liquid in a direction away from the die assembly 24.

The feed hopper 23 provides a supply of the high solids sludge 18 to be processed for feeding through a feed port 16 within the wall of the extrusion machine 21. A layer of liquid 17 surmounts the high solids sludge 18 within said feed hopper 23.

Rotation of the screw 12 forces the high solids sludge and accompanying liquid, from the hopper 23 in a continuous stream toward the extrusion machine die assembly 24. Deliquefication of the sludge occurs as it progresses through the chamber 22 under the increasing pressure of the screw 12. At the extrusion end of the extrusion machine 21 the solids particles are plastically deformed, worked together, and extruded through the die 25 as an almost liquid-free cohesive solid shape 26. A portion of the liquid removed from the sludge does not escape through the die 25 but is conveyed in a direction opposite the movement of the sludge. It is expressed around the clearance provided between the screw 12 and the wall of the chamber 22. No liquid escape port is provided in this embodiment and the liquid is therefore forced back into the feed hopper 23. The feeding of the liquid removed from the sludge back into the feed hopper 23 supplements the liquid phase present, thereby assisting in preserving the required continuous liquid phase above the sludge solids.

In addition thereto, this backflow of liquid into the feed hopper 23 produces a circulation or slight turbulence therein, especially at that portion of the feed zone which is closest the feed port 16, and prevents any tendency of rapid settling by the finely divided solids or lead particles. This effect creates a more uniform charge for feeding into the extrusion chamber 22. This modification is also applicable to a ram type extruder.

To further illustrate typical embodiments of the process of the invention, the following examples are illustrative. Except as otherwise stated "pressure" as used in the following means the pressure in pounds per square inch, and compositions are in weight percentages. As already stated, a typical material processed is a lead solids sludge containing tetraethyllead, as in the examples below.

*Example 1*

In this example, and in the following example, the high lead solids content sludge is provided within a feed hopper 23 and fed into a ram type extrusion press which provides an extrusion ratio of 7:1. The following example exemplifies a preferred method of operation. This method cumulates a series of deliquefied charges within the extrusion chamber 22 prior to an actual extrusion of the cumulated charges.

A supply of sludge of the following weight composition was provided within the feed hopper 23:

| | |
|---|---|
| Lead particles | 83 |
| Aqueous phase | 12 |
| Tetraethyllead | 5 |

The lead particles were finely divided comminuted particles varying in size from about 0.005 to about 0.05 of an inch in diameter. A surmounting layer of water, approximately two inches deep, and substantially free of solids material covered the said sludge. During the operation, given as follows, it was found necessary to add water at a rate equal to about 10 percent of the volumetric proportions of the total volume of sludge fed into the extrusion chamber 22 in order to maintain this level.

In operation, the ram 12 and plunger 25 was retracted sufficiently to permit a first charge of the sludge to be introduced into the chamber 22. Forward movement of the ram 12 and plunger 25 was then started, a pressure of approximately 500 pounds being applied to the charge. Under this force, a substantial portion of the liquid phases, amounting to about 75 percent of that initially present was expressed around the face of the plunger 25. In this instance, flow of liquid past the plunger 25 was made possible by a moderate clearance, between the plunger 25 and the internal walls of the chamber 22, amounting to about 0.001 inch per inch of cross sectional diameter of the plunger 25. The liquid so expressed is removed from the press through the drain port 41. A portion of the liquid was also expressed through the die 34. The application of this pre-treating pressure was not sufficient to cause deformation and flow of lead particles through the die 34. The ram 12 and plunger 25 was then rapidly retracted at a linear rate of approximately 0.7 feet per second. The result of said deliquefication and rapid retraction produced a vacuum of approximately 10 pounds within the chamber 22. This retraction is continued until the plunger 25 has moved far enough backward to allow opening of the feed port 32 to the feed hopper 23. At that moment a fresh charge of sludge 31, and accompanying water 33, is forcibly withdrawn from the feed hopper 23. The open space in the chamber 22, which was only about two-thirds of the original available volume due to the presence in the chamber of the first deliquefied charge, was substantially completely filled. The turbulence created by the rapid filling of the chamber 22 agitated and stirred the contents of the feed hopper 23. The second charge was again pressed under a pressure of 500 pounds, and the ram 12 and plunger 25 again retracted, this time establishing a chargeable space of about 50 percent of the original chamber volume, due to the cumulation of the first and second pressed charges. The chargeable space was again filled to the extent of deliquefication and the contents of the feed hopper 23 again agitated by the rapid filling of the chamber 22. An additional, or third fresh charge was then introduced, and again a pressure of 500 pounds was applied. Upon completion of three charges, the chamber was about 60 to 65 percent full. The pressure applied by the ram 12 and plunger 25 was increased to about 14,500 pounds at this time. This pressure was accompanied by further removal of substantially all the remaining liquid phases (including both the aqueous and the tetraethyllead liquid) and by the transmittal through the extrusion die 13 of an apparently homogeneous solid bar-like product 35 which upon analysis showed a water content of 0.8 percent by weight and a tetraethyllead content of 0.8 percent by weight.

The following example is the same as the foregoing example in all respects except that there is no cumulation of a series of separate charges within the extrusion chamber 22.

*Example II*

A charge of sludge was introduced into the extrusion chamber 22. The ram 12 and plunger 25 traversed the whole length of the extrusion chamber. The charge was deliquefied and the solids compacted, and at the termination of the stroke, the lead particles are plastically deformed, worked together and extruded as a solid shape 35. The ram 12 and plunger 25 was withdrawn and a fresh charge of sludge introduced into the extrusion chamber 22.

The feeding of the high lead solids sludge 31, and accompanying water 33, was accomplished as effectively as in the foregoing example. Each non-working or retraction stroke of the ram 12 and plunger 25 resulted in a substantially complete filling of the extrusion chamber 22 with a fresh charge. Each filling thereof produced a turbulence which agitated the contents of the feed hopper 23. The liquid content of the extruded product and the amount of the tetraethyllead component was also approximately the same.

The foregoing examples illustrate the applicability of the feeding technique to a ram type extruder regardless of the amount of high lead solids sludge required to fill the extrusion chamber. In other words, the present feeding technique is beneficial both in embodiments using a series of cumulated charges and when a single charge is processed. The following example employs a lesser extrusion ratio than the foregoing and consequently requires a lesser pressure for extrusion. The lead sludge composition is also different.

*Example III*

A supply of sludge 31 of the following weight composition was provided within the feed hopper 23:

Lead particles ---------------------------------- 74
Tetraethyllead ---------------------------------- 14.8
Water ------------------------------------------ 10.9

At all times, a surmounting layer of water, several inches in depth, was maintained over the solids of the sludge. During the operation, to maintain this level water was added at a rate of about 10 volumetric percent of the total volume of sludge fed into the extrusion chamber 22.

Again using the same procedure as in Example I above, but with an extrusion ratio of 3.1:1 and an extrusion pressure of 8,000 pounds, an extruded product having 0.87 percent tetraethyllead, and 0.55 percent water was obtained. The feeding of the high lead solid sludge 31, and accompanying water 33, was accomplished effectively and efficiently.

*Example IV*

Example III was repeated except there was no cumulation of charges prior to an actual extrusion. Feeding of the high lead solids sludge 31, and accompanying water 33, was accomplished as effectively. The extruded product contained liquid of substantially equal proportions and quantity as in the foregoing example.

The foregoing examples have illustrated the process, and feeding technique, as applied to a ram type extrusion press. The following example shows the applicability of the process as applied in a screw type extruder.

*Example V*

Sludge of the same composition as that processed in Example I is provided within a feed hopper 23. A surmounting layer of water, approximately seven inches in depth is also maintained therein. The sludge, and accompanying liquid, is continuously fed into the extrusion chamber 22 of a screw type extrusion press having an extrusion ratio of 7:1. The sludge is treated in the extrusion press at a screw 12 speed of 16 revolutions per minute. As the sludge moves along the length of the extrusion chamber 22, deliquefication occurs and some of the liquid removed is expressed around the circumference of the screw 12, through the clearance provided, and back into the feed hopper 23. The return of liquid therein creates a circulation which agitates and prevents settling of the solid particles within the feed hopper 23. At the extrusion end of the chamber 22 the deliquefied solid particles are plastically deformed, worked together and are extruded at an extrusion pressure of approximately 14,500 pounds through the die 25 as a cohesive bar-like shape 26. Liquid also passes through the die 25, separate and apart from the bar-like shape 26. The extruded product is found to contain 0.7 percent by weight water and 0.7 percent by weight tetraethyllead.

During said operation the addition of water to the feed hopper is unnecessary. Liquid, water and tetraethyllead, are removed from the feed hopper 23 at a volumetric rate of 60 percent of the sludge fed therein to maintain the liquid level within the feed hopper.

In all the foregoing examples the surmounting liquid layer supplied to the feed hopper 23 has been limited to an aqueous phase. In the following examples however, there is illustrated a simple technique which produces additional benefits by providing an extraction step. This is done by simply adding or supplying to the sludge within the feed zone a liquid which is immiscible with water but miscible with tetraethyllead. As a result nearly all the tetraethyllead is extracted from the lead particles and the extruded product is virtually free thereof. The added liquid, or solvent may have a density greater than or less than water. The following example utilizes a solvent having a density less than water.

*Example VI*

Example I is repeated except that a surmounting layer of ethyl chloride, approximately three inches deep and substantially free of solids material is maintained over the sludge solids within the feed zone.

Each non-working or retraction stroke of the ram 12 and plunger 25 permits a fresh charge of sludge, and accompanying ethyl chloride solvent to be introduced into, and to substantially fill, to the extent of evacuation by the liquid or solid, the chamber 22. Each filling, or partial filling thereof creates a circulation or slight turbulence which agitates the contents within the feed hopper 23 creating a more uniform charge for subsequent feeding and also aiding in the extraction of the tetraethyllead from the finely divided lead solids by producing more intimate contact of the solvent therewith. Extraction of said tetraethyllead component continues throughout the complete cycle of operation. Most of the tetraethyllead component is removed from the finely divided lead solids and expressed around the ram clearance. Extraction of tetraethyllead by the ethyl chloride solvent continues throughout the operation. The extruded product contains about 1.6 percent by weight liquid, only a minute amount of which is tetraethyllead.

In the following example a solvent having a density greater than water was employed.

*Example VII*

Example VI is repeated except that the solvent added within the feed zone is ethyl dibromide. Results equally as good were obtained.

The foregoing examples and description illustrate the wide and flexible applicability of the process of the invention. As demonstrated by the examples, the benefits derived result from an automatic and rapid feeding of a sludge into a compression-extrusion chamber and the segregation thereof into a liquids and a solids portion, the latter as a cohesive solid product containing only a small amount of liquid. By the use of a solvent immiscible with water but miscible with tetraethyllead it is found that a further very important advantage is obtained in that the recovery of the tetraethyllead is improved or facilitated.

In the foregoing description and examples it will be seen that the high lead solids sludges in all instances include both tetraethyllead and water components. The water may have variable but more or less small amounts of dissolved compounds therein such as sodium chloride. The quantities of these two normally present liquid components is not highly critical.

When the sum total of liquid concentration is low however, it is generally desirable to supply additional liquid to maintain the necessary liquid layer in the feed zone. Thus, when the liquid concentration of the fresh sludge is below about 40 volumetric percent of the total volume of the sludge it has generally been found desirable to add sufficient liquid to bring the liquid concentration up to about 60 volumetric percent based on the total volume of the sludge. The said liquid is usually added at such a rate as to maintain a substantially solids-free liquid level of at least two inches above the solids within said feed zone. This is true without regard to whether the added liquid, or liquids, is miscible or immiscible with the water of the sludge. The height at which the liquid level is maintained above this level is not highly critical. Generally it may be said that there is no critical upper limit thereof, but generally it is unnecessary to have a liquid layer of more than about ten inches above the solids of the sludge.

As has already been stated, the liquid added to the high solids sludge within the feed zone may be water, or other aqueous liquid, or may be some other liquid having a greater or lesser density and miscible or immiscible with water. The solvents which are miscible with water include water itself or other aqueous solutions, alcohols, aldehydes and ketones. Illustrative of such compounds are methyl alcohol, ethyl alcohol, propyl alcohol, acetaldehyde, and acetone. A highly preferred liquid however is one which is immiscible with water but miscible with tetraethyllead. Such solvents include for example halogenated hydrocarbons, aromatic hydrocarbons, aliphatic hydrocarbons, alcohols, ethers, and ketones. Ethyl chloride, isooctane, and kerosene are particularly valuable, but ethyl chloride is the preferred solvent. This is due to several factors. Principally, however, because it is highly soluble in and absorbs the tetraethyllead and spontaneously forms a separate phase from the aqueous phase. The ethyl chloride because of the great difference between its boiling point and that of the tetraethyllead and because of its low boiling point is subsequently easily removed from the tetraethyllead by a simple batch operation. Of the class of solvents which are heavier than water, ethyl dichloride and ethyl dibromide are particularly useful.

When employing a solvent immiscible with and lighter than water it is necessary, so that this phase surmounts the solids of the sludge, to add sufficient quantity thereof that the resultant density after absorbing the tetraethyllead within the sludge is lighter than water. This is because the density of tetraethyllead is considerably greater than the density of water. If a small concentration were added to the sludge the resultant density would be greater than water or aqueous phase and said aqueous phase would be displaced and would become the surmounting liquid layer. Either alternative, however, is not important since the only essential requisite for feeding is that there be some kind of surmounting liquid layer. The result of insufficient addition of the less dense solvent would be the same as when initially a solvent having a density greater than the aqueous phase were added to the feed zone. Insofar as operability of the process is concerned, however, either alternative may be employed. It is of no consequence which liquid layer surmounts the solids of the sludge as long as the solids are at all times covered thereby.

When employing a solvent which is miscible with water there will be no separate phase produced by displacement of liquid. The separate phase in this case is of essentially the same composition as the liquid phase intermingled with the solids particles. The surmounting liquid layer in this instance is an essentially solids free layer surmounting the solids of the sludge.

The applicability of the above described process is not limited to any specific type of extrusion press. The process is applicable to both ram type and screw type extrusion presses. The process, however, is especially well suited to the operation of ram type extrusion presses.

The method of operating a ram type extruder, i.e., whether the ram traverses the whole length of the extrusion chamber and extrudes the solids at each feeding or whether a series of low pressure charge cumulating strokes, or the number thereof, is not critical. Generally however, it has been found that the technique of cumulating and treating a series of charges prior to an actual extrusion produces a better extraction of tetraethyllead when a solvent-extraction step is a part of the feeding operation.

The foregoing examples are to be regarded as illustrative rather than as limitations as considerable variations may be made in the proportions of the lead solids within the charge, the kind of metal, or metals, within the charge, the details of operation; such as the speed of extrusion, rate of retraction of a ram, whether or not pretreating applications are applied before an actual extrusion, power employed by the hydraulic system, extrusion ratios, etc.

Having therefore described the invention, what is claimed is:

1. An improvement in a process for separating the components of a high solids lead sludge and converting the leads into a substantially liquid-free, solid, form, the sludge consisting essentially of at least about 15 volume percent lead particles, an aqueous phase, and tetraalkyllead, the process comprising feeding said sludge to a supply zone, said zone being adjacent to and communicating through a feed port with a compression-extrusion zone having a reciprocable snugly fitting compression plunger therein and an extrusion aperture, said extrusion aperture being remote from said feed port, retracting the reciprocable plunger past the said feed port, and charging a portion of sludge into the said compression-extrusion zone, then compressing the said charge and thereby deliquefying and extruding the solids thereof through the extrusion aperture as a substantially liquid bar, and repeating said retraction and extrusion cycle, the improvement comprising supplying additional aqueous liquid to said supply zone in quantity sufficient to maintain a layer of solids-free aqueous liquid, of at least about 2 inches in depth, above the solids in said supply zone, and carrying out the retraction strokes of said plunger at a substantially greater rate of speed than the compression-extrusion strokes, whereby a vacuum is generated within said compression-extrusion zone and sequential charges of sludge are induced into said zone.

2. The process of claim 1 further defined in that the layer of solids-free aqueous liquid is maintained in depth from at least about 2 to 10 inches above the solids in said supply zone.

References Cited in the file of this patent

UNITED STATES PATENTS

| | | |
|---|---|---|
| 2,711,686 | Denison et al. | June 28, 1955 |
| 2,756,668 | Seed et al. | July 31, 1956 |